(12) United States Patent
Sun (10) Patent No.: US 12,411,315 B2
(45) Date of Patent: Sep. 9, 2025

(54) CAMERA OPTICAL LENS (71) Applicant: Changzhou Raytech Optronics Co., Ltd., Changzhou (CN)

(72) Inventor: Wen Sun, Shenzhen (CN)

(73) Assignee: Changzhou Raytech Optronics Co., Ltd., Changzhou (CN)

( * ) Notice: Subject to any disclaimer, the term of this patent is extended or adjusted under 35 U.S.C. 154(b) by 756 days.

(21) Appl. No.: 17/134,191

(22) Filed: Dec. 25, 2020

(65) Prior Publication Data

US 2022/0026679 A1    Jan. 27, 2022

(30) Foreign Application Priority Data

Jul. 27, 2020    (CN) .......................... 202010727552.8

(51) Int. Cl.
  *G02B 13/00*  (2006.01)
  *G02B 13/06*  (2006.01)
  *G02B 13/18*  (2006.01)

(52) U.S. Cl.
  CPC ......... *G02B 13/0045* (2013.01); *G02B 13/06* (2013.01); *G02B 13/18* (2013.01)

(58) Field of Classification Search
  CPC ... G02B 13/0045; G02B 13/18; G02B 13/002
  See application file for complete search history.

(56) References Cited

U.S. PATENT DOCUMENTS

2020/0012078 A1*  1/2020  Kuo .......................... G02B 9/64
2020/0073092 A1*  3/2020  Chen ....................... G02B 13/18
2020/0201002 A1*  6/2020  Xu ...................... G02B 13/0045

\* cited by examiner

*Primary Examiner* — Thomas K Pham
*Assistant Examiner* — Justin W. Hustoft
(74) *Attorney, Agent, or Firm* — Wiersch Law Group (57) ABSTRACT

A camera optical lens includes, from an object side to an image side, a first lens, a second lens, a third lens, a fourth lens, a fifth lens, a sixth lens, a seventh lens, and an eighth lens. At least one of the first lens to the eighth lens has a free-form surface, and the camera optical lens satisfies: $-3.50 \leq f2/f1 \leq -1.50$; and $-2.00 \leq R9/R10 \leq -0.80$, where f1 is a focal length of the first lens, f2 is a focal length of the second lens, R9 is a central curvature radius of an object side surface of the fifth lens, and R10 is a central curvature radius of an image side surface of the fifth lens. The camera optical lens has a large aperture, a wide angle, and ultra-thinness, as well as excellent optical performance.

9 Claims, 6 Drawing Sheets

CAMERA OPTICAL LENS

TECHNICAL FIELD

The present disclosure relates to the field of optical lenses, and more particularly, to a camera optical lens suitable for portable terminal devices such as smart phones and digital cameras, and suitable for imaging devices such as monitors and PC lenses.

BACKGROUND

With development of camera lenses, higher and higher requirements are put forward for imaging of the lens. The "night scene photography" and "background blur" of the lens have also become important indicators to measure an imaging of the lens. The structures in related art have insufficient focal power distribution, lens spacing and lens shape settings, resulting in insufficient ultra-thin and wide-angle lenses. Moreover, the rotationally symmetric aspherical surface cannot correct aberrations well. A free-form surface is a non-rotationally symmetric surface, which can better balance aberrations and improve the imaging quality; besides, processing of the free-form surface has been gradually mature. With the increasing requirements for imaging of the lens, it is very important to provide a free-curve surface in the design of a lens, especially in the design of a wide-angle and ultra-wide-angle lens.

SUMMARY

In view of the above-mentioned problems, a purpose of the present disclosure is to provide a camera optical lens, which has a large aperture, a wide angle, and ultra-thinness, as well as excellent optical performance.

A camera optical lens is provided and the camera optical lens includes, from an object side to an image side, a first lens, a second lens, a third lens, a fourth lens, a fifth lens, a sixth lens, a seventh lens, and an eighth lens. At least one of the first lens, the second lens, the third lens, the fourth lens, the fifth lens, the sixth lens, the seventh lens, or the eighth lens has a free-form surface, and the camera optical lens satisfies:

$-3.50 \leq f2/f1 \leq -1.50$; and $-2.00 \leq R9/R10 \leq -0.80$, where f1 denotes a focal length of the first lens, f2 denotes a focal length of the second lens, R9 denotes a central curvature radius of an object side surface of the fifth lens, and R10 denotes a central curvature radius of an image side surface of the fifth lens.

As an improvement, the camera optical lens satisfies:

$1.40 \leq d10/d12 \leq 3.00$, where d10 denotes an on-axis distance from the image side surface of the fifth lens to an object side surface of the sixth lens, and d12 denotes an on-axis distance from an image side surface of the sixth lens to an object side surface of the seventh lens.

As an improvement, the camera optical lens satisfies:

$-4.43 \leq f1/f \leq -1.24$;

$-2.24 \leq (R1+R2)/(R1-R2) \leq -0.28$; and $0.05 \leq d1/TTL \leq 0.14$, where f denotes a focal length of the camera optical lens, R1 denotes a central curvature radius of an object side surface of the first lens, R2 denotes a central curvature radius of an image side surface of the first lens, d1 denotes an on-axis thickness of the first lens, and TTL denotes a total optical length from an object-side surface of the first lens to an image plane of the camera optical lens along an optic axis.

As an improvement, the camera optical lens satisfies:

$1.81 \leq f2/f \leq 10.68$;

$-11.57 \leq (R3+R4)/(R3-R4) \leq -2.79$; and $0.03 \leq d3/TTL \leq 0.10$, where f denotes a focal length of the camera optical lens, R3 denotes a central curvature radius of an object side surface of the second lens, R4 denotes a central curvature radius of an image side surface of the second lens, d3 denotes an on-axis thickness of the second lens, and TTL denotes a total optical length from an object-side surface of the first lens to an image plane of the camera optical lens along an optic axis.

As an improvement, the camera optical lens satisfies:

$-48.31 \leq f3/f \leq 3.71$;

$-1.57 \leq (R5+R6)/(R5-R6) < 15.62$; and $0.02 \leq d5/TTL \leq 0.12$, where f denotes a focal length of the camera optical lens, f3 denotes a focal length of the third lens, R5 denotes a central curvature radius of an object side surface of the third lens, R6 denotes a central curvature radius of an image side surface of the third lens, d5 denotes an on-axis thickness of the third lens, and TTL denotes a total optical length from an object-side surface of the first lens to an image plane of the camera optical lens along an optic axis.

As an improvement, the camera optical lens satisfies:

$0.56 \leq f4/f \leq 3.19$;

$0.01 \leq (R7+R8)/(R7-R8) \leq 1.51$; and $0.04 \leq d7/TTL \leq 0.19$, where f denotes a focal length of the camera optical lens, f4 denotes a focal length of the fourth lens, R7 denotes a central curvature radius of an object side surface of the fourth lens, R8 denotes a central curvature radius of an image side surface of the fourth lens, d7 denotes an on-axis thickness of the fourth lens, and TTL denotes a total optical length from an object-side surface of the first lens to an image plane of the camera optical lens along an optic axis.

As an improvement, the camera optical lens satisfies:

$-6.34 \leq f5/f \leq -1.96$;

$-0.06 \leq (R9+R10)/(R9-R10) \leq 0.47$;

$0.02 \leq d9/TTL \leq 0.07$, where f denotes a focal length of the camera optical lens, f5 denotes a focal length of the fifth lens, R9 denotes a central curvature radius of the object side surface of the fifth lens, R10 denotes a central curvature radius of the image side surface of the fifth lens, d9 denotes an on-axis thickness of the fifth lens, and TTL denotes a total optical length from an object-side surface of the first lens to an image plane of the camera optical lens along an optic axis.

As an improvement, the camera optical lens satisfies:

$-11.90 \leq f6/f \leq -1.72$;

$-0.71 \leq (R11+R12)/(R11-R12) \leq -0.161$; and $0.04 \leq d11/TTL \leq 0.13$, where f denotes a focal length of the camera optical lens, f6 denotes a focal length of the sixth lens, R11 denotes a central curvature radius of an object side surface of the sixth lens, R12 denotes a central curvature radius of an image side surface of the sixth lens, d11 denotes an on-axis thickness of the sixth lens, and TTL denotes a total optical length from an object-side surface of the first lens to an image plane of the camera optical lens along an optic axis.

As an improvement, the camera optical lens satisfies:

$0.42 \leq f7/f \leq 1.38$;

$0.25 \leq (R13+R14)/(R13-R14) \leq 1.05$; and $0.04 \leq d13/TTL \leq 0.12$, where f denotes a focal length of the camera optical lens, f7 denotes a focal length of the seventh lens, R13 denotes a central curvature radius of an object side surface of the seventh lens, R14 denotes a central curvature radius of an image side surface of the seventh lens, d13 denotes an on-axis thickness of the seventh lens, and TTL denotes a total optical length from an object-side surface of the first lens to an image plane of the camera optical lens along an optic axis.

As an improvement, the camera optical lens satisfies:

$-2.63 \leq f8/f \leq -0.85$;

$1.14 \leq (R15+R16)/(R15-R16) \leq 3.83$; and $0.03 \leq d15/TTL \leq 0.11$, where f denotes a focal length of the camera optical lens, f8 denotes a focal length of the eighth lens, R15 denotes a central curvature radius of an object side surface of the eighth lens, R16 denotes a central curvature radius of an image side surface of the eighth lens, d15 denotes an on-axis thickness of the eighth lens, and TTL denotes a total optical length from an object-side surface of the first lens to an image plane of the camera optical lens along an optic axis.

With the camera optical lens of the present disclosure, the lens has good optical performance with a large aperture, ultra-thinness and a wide angle. Meanwhile, at least one of the first lens to the eighth lens has a free-form surface, thereby effectively correcting aberration and improving the performance of the optical system. It is suitable for mobile phone camera lens assembly and WEB camera lens composed of imaging elements for high pixel such as high-pixel CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

In order to better illustrate the purpose, technical solutions and advantages of the present disclosure, the embodiments of the present disclosure will be described in details as follows with reference to the accompanying drawings. However, it should be understood by those skilled in the art that, technical details are set forth in the embodiments of the present disclosure so as to better illustrate the present disclosure. However, the technical solutions claimed in the present disclosure can be achieved without these technical details and various changes and modifications based on the following embodiments.

Embodiment 1

Figure 1:
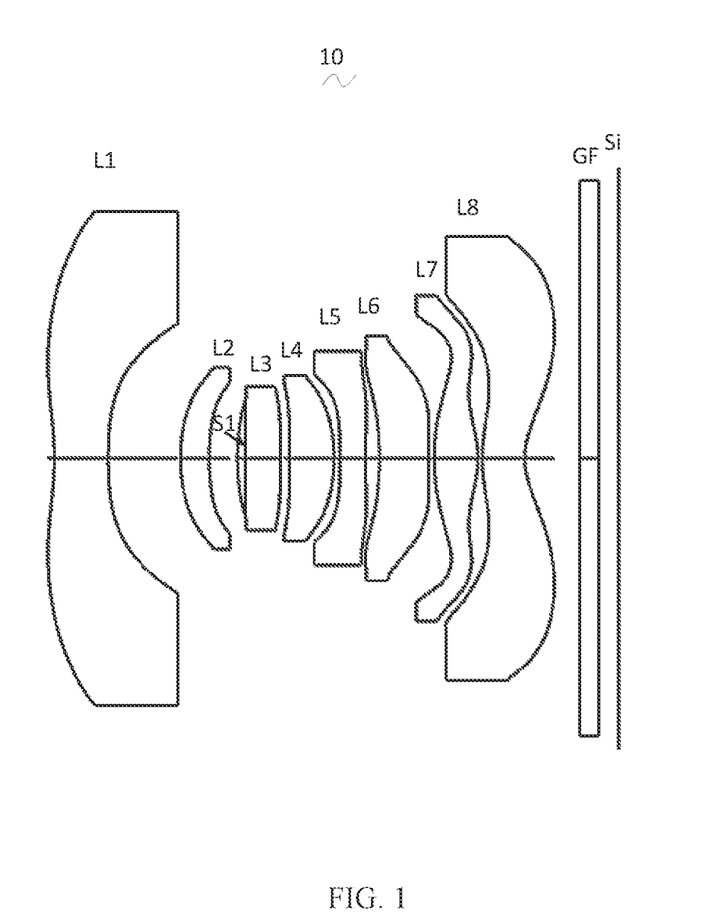
FIG. 1 is a schematic structural diagram of a camera optical lens according to Embodiment 1 of the present disclosure.

With reference to the accompanying drawings, the present disclosure provides a camera optical lens 10. FIG. 1 illustrates a camera optical lens 10 according to Embodiment 1 of the present disclosure. The camera optical lens 10 includes eight lenses. Specifically, the camera optical lens 10 includes, from an object side to an image side, a first lens L1, a second lens L2, an aperture S 1, a third lens L3, a fourth lens L4, a fifth lens L5, a sixth lens L6, a seventh lens L7, and an eighth lens L8. Optical elements such as an optical filter GF can be provided between the eighth lens L8 and an image plane Si.

As an example, the first lens L1 is made of a plastic material, the second lens L2 is made of a plastic material, the third lens L3 is made of a plastic material, the fourth lens L4 is made of a plastic material, the fifth lens L5 is made of a plastic material, the sixth lens L6 is made of a plastic material, the seventh lens L7 is made of a plastic material, and the eighth lens L8 is made of a plastic material. In other embodiments, each lens can be made of another material.

As an example, at least one of the first lens L1 to the eighth lens L8 includes a free-form surface, and the free-form surface contributes to correction of aberrations such as astigmatism, field curvature, and distortion in a wide-angle optical system.

As an example, a focal length of the first lens L1 is f1, and a focal length of the second lens L2 is f2, then the camera optical lens satisfies the following condition: $-3.50 \leq f2/f1 \leq -1.50$, which specifies a ratio of the focal length of the second lens L2 to the focal length of the first lens L1. With this condition, it is beneficial to improving the imaging quality.

As an example, a central curvature radius of an object side surface of the fifth lens L5 is R9, and a central curvature radius of an image side surface of the fifth lens L5 is R10, then the camera optical lens satisfies the following condition: $-2.00 \leq R9/R10 \leq -0.80$, which specifies a shape of the fifth lens L5. Within a range defined by this condition, it is beneficial to reducing a degree of light deflection and improving the image quality.

When the camera optical lens 10 of the present disclosure includes at least one free-form surface, and the focal length of the related lens and the central curvature radius of the related lens satisfy the above-mentioned condition, the camera optical lens 10 can have high performance and meet the requirements of a large aperture, a wide angle and ultra-thinness.

As an example, an on-axis distance from an image side surface of the fifth lens L5 to an object side surface of the sixth lens L6 is d10, and an on-axis distance from an image side surface of the sixth lens L6 to an object side surface of the seventh lens L7 is d12, then the camera optical lens satisfies the following condition: $1.40 \leq d10/d12 < 3.00$. With this condition, the field curvature of the system can be balanced, and the imaging quality can be improved.

As an example, the first lens L1 has a negative refractive power, an object side surface of the first lens L1 is concave in a paraxial region, and an image side surface of the first lens L1 is concave in a paraxial region. In other embodiments, the first lens L1 can have a positive refractive power.

As an example, a focal length of the camera optical lens 10 is f, and the camera optical lens satisfies the following condition: $-4.43 \leq f1/f \leq -1.24$, which limits a ratio of the focal length of the first lens L1 to the focal length f. By controlling negative refractive power of the first lens L1 within a reasonable range, it is beneficial to correcting aberration of the optical system. As an example, the camera optical lens satisfies the following condition: $-2.77 \leq f1/f \leq -1.55$.

As an example, a central curvature radius of the object side surface of the first lens L1 is R1, and a central curvature radius of the image side of the first lens L1 is R2, then the camera optical lens satisfies the following condition: $-2.24 \leq (R1+R2)/(R1-R2) \leq -0.28$. By reasonably controlling a shape of the first lens L1, the first lens L1 can effectively correct spherical aberration of the system. As an example, the camera optical lens satisfies the following condition: $-1.40 \leq (R1+R2)/(R1-R2) \leq -0.35$.

As an example, an on-axis thickness of the first lens L1 is d1, and TTL denotes a total optical length from an object-side surface of the first lens to an image plane of the camera optical lens along an optic axis, then the camera optical lens satisfies the following condition: $0.05 \leq d1/TTL \leq 0.14$, which is beneficial to achieving ultra-thinness. As an example, the camera optical lens satisfies the following condition: $0.07 \leq d1/TTL \leq 0.11$.

As an example, the second lens L2 has a positive refractive power, the object side surface of the second lens L2 is convex in a paraxial region, and the image side surface of the second lens L2 is concave in a paraxial region. In other embodiments, the second lens L2 can have a negative refractive power.

As an example, the camera optical lens satisfies the following condition: $1.81 \leq f2/f \leq 10.68$, which specifies a ratio of the focal length of the second lens L2 to the focal length f. With this condition, the second lens L2 has an appropriate positive refractive power, which is beneficial to reducing aberration of the system, as well as beneficial to achieving ultra-thinness and a wide angle of the lens. As an example, the camera optical lens satisfies the following condition: $2.89 \leq f2/f \leq 8.54$.

As an example, a central curvature radius of the object side surface of the second lens L2 is R3, and a central curvature radius of the image side surface of the second lens L2 is R4, then the camera optical lens satisfies the following condition: $-11.57 \leq (R3+R4)/(R3-R4) \leq -2.79$, which specifies a shape of the second lens L2. With this condition, with development of ultra-thinness and wide-angle of the lens, it is beneficial to correcting on-axis color aberration. As an example, the camera optical lens satisfies the following condition: $-7.23 \leq (R3+R4)/(R3-R4) \leq -3.49$.

As an example, an on-axis thickness of the second lens L2 is d3, and TTL denotes a total optical length from an object-side surface of the first lens to an image plane of the camera optical lens along an optic axis, then the camera optical lens satisfies the following condition: $0.03 \leq d3/TTL \leq 0.10$. With this condition, it is beneficial to achieving ultra-thinness. As an example, the camera optical lens satisfies the following condition: $0.04 \leq d3/TTL \leq 0.08$.

As an example, the third lens L3 has a positive refractive power, the object side surface of the third lens L3 is convex in a paraxial region, and the image side surface of the third lens L3 is convex in a paraxial region. In other embodiments, the third lens L3 can have a negative refractive power.

As an example, a focal length of the third lens L3 is f3, then the camera optical lens satisfies the following condition: $-48.31 \leq f3/f \leq 3.71$. With this condition, limitation on the third lens L3 with this condition can effectively smooth the light angle of the camera lens and reduce tolerance sensitivity. As an example, the camera optical lens satisfies the following condition: $-30.19 \leq f3/f \leq 2.97$.

As an example, a central curvature radius of the object side surface of the third lens L3 is R5, and a central curvature radius of the image side surface of the third lens L3 is R6, then the camera optical lens satisfies the following condition: $-1.57 \leq (R5+R6)/(R5-R6) \leq 15.62$, which specifies a shape of the third lens L3. Within a range defined by this condition and the development of ultra-thinness and wide-angle, it is beneficial to correcting aberration of an off-axis angle. As an example, the camera optical lens satisfies the following condition: $-0.98 \leq (R5+R6)/(R5-R6) \leq 12.50$.

As an example, an on-axis thickness of the third lens L3 is d5, and TTL denotes a total optical length from an object-side surface of the first lens to an image plane of the camera optical lens along an optic axis, then the camera optical lens satisfies the following condition: $0.02 \leq d5/TTL \leq 0.12$. With this condition, it is beneficial to achieving ultra-thinness. As an example, the camera optical lens satisfies the following condition: $0.04 \leq d5/TTL \leq 0.09$.

As an example, the fourth lens L4 has a positive refractive power, the object side surface of the fourth lens L4 is concave in a paraxial region, and the image side surface is convex in a paraxial region. In other embodiments, the fourth lens L4 can have a negative refractive power.

As an example, the focal length of the fourth lens L4 is f4, then the camera optical lens satisfies the following condition: $0.56 \leq f4/f \leq 3.19$, which specifies a ratio of the focal length of the fourth lens L4 to the focal length f With this condition, it is beneficial to improving the performance of the optical system. As an example, the camera optical lens satisfies the following condition: $0.89 \leq f4/f \leq 2.55$.

As an example, a central curvature radius of the object side surface of the fourth lens L4 is R7, and a central curvature radius of the image side surface of the fourth lens L4 is R8, then the camera optical lens satisfies the following condition: $0.01 \leq (R7+R8)/(R7-R8) \leq 1.51$, which specifies a shape of the fourth lens L4. With this condition and the development of ultra-thinness and wide-angle, it is beneficial to correcting aberration of an off-axis angle. As an example, the camera optical lens satisfies the following condition: $0.02 \leq (R7+R8)/(R7-R8) \leq 1.21$.

As an example, an on-axis thickness of the fourth lens L4 is d7, and TTL denotes a total optical length from an object-side surface of the first lens to an image plane of the camera optical lens along an optic axis, then the camera optical lens satisfies the following condition: $0.04 \leq d7/TTL \leq 0.19$. With this condition, it is beneficial to achieving ultra-thinness. As an example, the camera optical lens satisfies the following condition: $0.06 \leq d7/TTL \leq 0.15$.

As an example, the fifth lens L5 has a negative refractive power, the object side surface of the fifth lens L5 is concave in a paraxial region, and the image side surface of the fifth lens L5 is concave in a paraxial region. In other embodiments, the fifth lens L5 can have a positive refractive power.

As an example, a focal length of the fifth lens L5 is f5, then the camera optical lens satisfies the following condition: $-6.34 \leq f5/f \leq -1.96$, which specifies a ratio of the focal length of the fifth lens L5 to the focal length. With this condition, it is beneficial to improving the performance of the optical system. As an example, the camera optical lens satisfies the following condition: $-3.96 \leq f5/f \leq -2.45$.

As an example, a central curvature radius of the object side surface of the fifth lens L5 is R9, and a central curvature radius of the image side surface of the fifth lens L5 is R10, then the camera optical lens satisfies the following condition: $-0.06 \leq (R9+R10)/(R9-R10) \leq 0.47$, which specifies a shape of the fifth lens L5. With this condition and the development of ultra-thinness and wide-angle, it is beneficial to correcting aberration of an off-axis angle. As an example, the camera optical lens satisfies the following condition: $-0.04 \leq (R9+R10)/(R9-R10) \leq 0.38$.

As an example, an on-axis thickness of the fifth lens L5 is d9, and TTL denotes a total optical length from an object-side surface of the first lens to an image plane of the camera optical lens along an optic axis, then the camera optical lens satisfies the following condition: $0.02 \leq d9/TTL \leq 0.07$. With this condition, it is beneficial to achieving ultra-thinness. As an example, the camera optical lens satisfies the following condition: $0.03 \leq d9/TTL \leq 0.05$.

As an example, the sixth lens L6 has a negative refractive power, the object side surface of the sixth lens L6 is concave in a paraxial region, and the image side surface is concave in a paraxial region. In other embodiments, the sixth lens L6 can have a positive refractive power.

As an example, a focal length of the sixth lens L6 is f6, then the camera optical lens satisfies the following condition: $-11.90 \leq f6/f \leq -1.72$. Reasonable distribution of the focal power enables the system to have better imaging quality and lower sensitivity. As an example, the camera optical lens satisfies the following condition: $-7.44 \leq f6/f \leq -2.15$.

As an example, a central curvature radius of the object side surface or the sixth lens L6 is R11, and a central curvature radius of the image side surface of the sixth lens L6 is R12, then the camera optical lens satisfies the following condition: $-0.71 \leq (R11+R12)/(R11-R12) \leq -0.16$, which specifies a shape of the sixth lens L6. With this condition and the development of ultra-thinness and wide-angle, it is beneficial to correcting aberration of an off-axis angle. As an example, the camera optical lens satisfies the following condition: $-0.44 \leq (R11+R12)/(R11-R12) \leq -0.20$.

As an example, an on-axis thickness of the sixth lens L6 is d11, and TTL denotes a total optical length from an object-side surface of the first lens to an image plane of the camera optical lens along an optic axis, then the camera optical lens satisfies the following condition: $0.04 \leq d11/TTL \leq 0.13$. With this condition, it is beneficial to achieving ultra-thinness. As an example, the camera optical lens satisfies the following condition: $0.07 \leq d11/TTL \leq 0.11$.

As an example, the seventh lens L7 has a positive refractive power, the object side surface of the seventh lens L7 is convex in a paraxial region, and the image side surface of the seventh lens L7 is convex in a paraxial region. In other embodiments, the seventh lens L7 can have a negative refractive power.

As an example, a focal length of the seventh lens L7 is f7, then the camera optical lens satisfies the following condition: $0.42 \leq f7/f \leq 1.38$. Reasonable distribution of the focal power enables the system to have better imaging quality and lower sensitivity. As an example, the camera optical lens satisfies the following condition: $0.67 \leq f7/f \leq 1.10$.

As an example, a central curvature radius of the object side surface of the seventh lens L7 is R13, and a central curvature radius of the image side surface of the seventh lens L7 is R14, then the camera optical lens satisfies the following condition: $0.25 \leq (R13+R14)/(R13-R14) \leq 1.05$, which specifies a shape of the seventh lens L7. With this condition and the development of ultra-thinness and wide-angle, it is beneficial to correcting aberration of an off-axis angle. As an example, the camera optical lens satisfies the following condition: $0.41 \leq (R13+R14)/(R13-R14) \leq 0.84$.

As an example, an on-axis thickness of the seventh lens L7 is d13, and TTL denotes a total optical length from an object-side surface of the first lens to an image plane of the camera optical lens along an optic axis, then the camera optical lens satisfies the following condition: $0.04 \leq d13/TTL \leq 0.12$. With this condition, it is beneficial to achieving ultra-thinness. As an example, the camera optical lens satisfies the following condition: $0.06 \leq d13/TTL \leq 0.10$.

As an example, the eighth lens L8 has a negative refractive power, the object side surface of the eighth lens L8 is convex in a paraxial region, and the image side surface is concave in a paraxial region. In other embodiments, the eighth lens L8 can have a positive refractive power.

As an example, a focal length of the eighth lens L8 is f8, then the camera optical lens satisfies the following condition: $-2.63 \leq f8/f \leq -0.85$. Reasonable distribution of the focal power enables the system to have better imaging quality and lower sensitivity. As an example, the camera optical lens satisfies the following condition: $-1.65 \leq f8/f \leq -1.06$.

As an example, a central curvature radius of the object side surface of the eighth lens L8 is R15, and a central curvature radius of the image side surface of the eighth lens L8 is R16, then the camera optical lens satisfies the following condition: $1.14 \leq (R15+R16)/(R15-R16) \leq 3.83$, which specifies a shape of the eighth lens L8. With this condition and the development of ultra-thinness and wide-angle, it is beneficial to correcting aberration of an off-axis angle. As an example, the camera optical lens satisfies the following condition: $1.83 \leq (R15+R16)/(R15-R16) \leq 3.06$.

As an example, an on-axis thickness of the eighth lens L8 is d15, and TTL denotes a total optical length from an object-side surface of the first lens to an image plane of the camera optical lens along an optic axis, then the camera optical lens satisfies the following condition: $0.03 \leq d15/TTL \leq 0.11$. With this condition, it is beneficial to achieving ultra-thinness. As an example, the camera optical lens satisfies the following condition: $0.05 \leq d15/TTL \leq 0.09$.

As an example, an F number FNO of the camera optical lens 10 is smaller than or equal to 1.85. Large aperture leads to good imaging performance. As an example, it is satisfied that the aperture value FNO is smaller than or equal to 1.82.

As an example, a ratio of the optical length TTL of the camera optical lens 10 to a full FOV image height IH (in a diagonal direction) is smaller than or equal to 1.15, which is beneficial to achieving ultra-thinness, for example, smaller than or equal to 1.10. The field of view (FOV) in the diagonal direction is larger than or equal to 110°, which is beneficial to achieving a wide angle. As an example, FOV is larger than or equal to 118°.

When the above-mentioned condition is satisfied, the camera optical lens 10 has good optical performance, and when the free-form surface is adopted, the designed image plane area can be matched with an actual use area, thereby improving the image quality of the effective area to the greatest extent; and according to the characteristics of the camera optical lens 10, the camera optical lens 10 is suitable for a mobile phone camera lens assembly and a WEB camera lens composed of imaging elements for high pixels such as CCD and CMOS. The camera optical lens 10 of the present disclosure will be described in the following by examples. The reference signs described in each example are as follows. The unit of each of the focal length, the on-axis distance, the central curvature radius and the on-axis thickness is mm.

TTL: the optical length (an on-axis distance from the object side surface of the first lens L1 to the image plane Si), in a unit of mm.

FNO: a ratio of an effective focal length of the camera optical lens 10 to an entrance pupil diameter.

Table 1, Table 2, and Table 3 show design data of the camera optical lens 10 according to the Embodiment 1 of the present disclosure. Herein, the object side surface and image side surface of the eighth lens L8 are free-form surfaces.

TABLE 1

|  | R |  | d |  | Nd |  | Nd |
|---|---|---|---|---|---|---|---|
| S1 | ∞ | d0 = | −2.080 |  |  |  |  |
| R1 | −2.685 | d1 = | 0.589 | nd1 | 1.5444 | v1 | 56.43 |
| R2 | 6.479 | d2 = | 0.784 |  |  |  |  |
| R3 | 1.853 | d3 = | 0.317 | nd2 | 1.6610 | v2 | 20.53 |
| R4 | 3.017 | d4 = | 0.307 |  |  |  |  |
| R5 | 2.710 | d5 = | 0.470 | nd3 | 1.5444 | v3 | 56.43 |
| R6 | −22.486 | d6 = | 0.095 |  |  |  |  |
| R7 | −861.494 | d7 = | 0.486 | nd4 | 1.5444 | v4 | 56.43 |
| R8 | −1.875 | d8 = | 0.068 |  |  |  |  |
| R9 | −11.503 | d9 = | 0.276 | nd5 | 1.6800 | v5 | 18.40 |
| R10 | 5.995 | d10 = | 0.151 |  |  |  |  |
| R11 | −3.812 | d11 = | 0.536 | nd6 | 1.5444 | v6 | 56.43 |
| R12 | 7.993 | d12 = | 0.062 |  |  |  |  |
| R13 | 3.212 | d13 = | 0.477 | nd7 | 1.5444 | v7 | 56.43 |
| R14 | −1.049 | d14 = | 0.045 |  |  |  |  |
| R15 | 1.822 | d15 = | 0.461 | nd8 | 1.6032 | v8 | 28.29 |
| R16 | 0.713 | d16 = | 0.600 |  |  |  |  |
| R17 | ∞ | d17 = | 0.210 | ndg | 1.5168 | vg | 64.17 |
| R18 | ∞ | d18 = | 0.217 |  |  |  |  |

Herein, the representation of each reference sign is as follows.
S1: aperture;
R: curvature radius at a center of an optical surface;
R1: central curvature radius of an object side surface of a first lens L1;
R2: central curvature radius of an image side surface of the first lens L1;
R3: central curvature radius of an object side surface of a second lens L2;
R4: central curvature radius of an image side surface of the second lens L2;
R5: central curvature radius of an object side surface of a third lens L3;
R6: central curvature radius of an image side surface of the third lens L3;
R7: central curvature radius of an object side surface of a fourth lens L4;
R8: central curvature radius of an image side surface of the fourth lens L4;
R9: central curvature radius of an object side surface of a fifth lens L5;
R10: central curvature radius of an image side surface of the fifth lens L5;

TABLE 1-continued

|  | R | d | Nd | Nd |
|---|---|---|---|---|

R11: central curvature radius of an object side surface of a sixth lens L6;
R12: central curvature radius of an image side surface of the sixth lens L6;
R13: central curvature radius of an object side surface of a seventh lens L7;
R14: central curvature radius of an image side surface of the seventh lens L7;
R15: central curvature radius of an object side surface of an eighth lens L8;
R16: central curvature radius of an image side surface of the eighth lens L8;
R17: central curvature radius of an object side surface of an optical filter GF;
R18: central curvature radius of an image side surface of the optical filter GF;
d: on-axis thickness of the lens, and on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the seventh lens L7;
d13: on-axis thickness of the seventh lens L7;
d14: on-axis distance from the image side surface of the seventh lens L7 to the object side surface of the eighth lens L8;
d15: on-axis thickness of the eighth lens L8;
d16: on-axis distance from the image side surface of the eighth lens L8 to the object side surface of the optical filter GF;
d17: on-axis thickness of optical filter GF;
d18: on-axis distance from the image side surface of the optical filter GF to the image plane;
nd: refractive index of d-line;
nd1: refractive index of d-line of the first lens L1;
nd2: refractive index of d-line of the second lens L2;
nd3: refractive index of d-line of the third lens L3;
nd4: refractive index of d-line of the fourth lens L4;
nd5: refractive index of d-line of the fifth lens L5;
nd6: refractive index of d-line of the sixth lens L6;
nd7: refractive index of d-line of the seventh lens L7;
nd8: refractive index of d-line of the eighth lens L8;
ndg: refractive index of d-line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
v8: abbe number of the eighth lens L8; and
vg: abbe number of the optical filter GF.

Table 2 shows aspherical data of each lens of the camera optical lens 10 according to the Embodiment 1 of the present disclosure.

TABLE 2

| | Conic coefficient | Aspherical coefficient | | | | |
|---|---|---|---|---|---|---|
| | k | A4 | A6 | A8 | A10 | A12 |
| R1 | −2.5000E+01 | 7.9612E−02 | −4.1699E−02 | 1.7283E−02 | −5.2633E−03 | 1.1361E−03 |
| R2 | −9.1444E+00 | 2.6336E−01 | −2.2263E−01 | 2.6504E−01 | −3.0201E−01 | 2.8169E−01 |
| R3 | −6.0227E−01 | 6.7970E−02 | 1.1398E−01 | −3.7014E−01 | 5.1257E−01 | 1.4861E+00 |
| R4 | 9.9906E+00 | 1.1297E−01 | −1.2790E−01 | 8.0135E−01 | −1.5331E+00 | 8.4713E−01 |
| R5 | −2.8588E−01 | 4.8415E−02 | −6.7193E−03 | 1.1140E−01 | −2.8255E−01 | 4.5759E−01 |
| R6 | −1.0000E+01 | −1.0430E−01 | −1.5819E−01 | 3.3610E−01 | −7.8443E−01 | 1.8484E+00 |
| R7 | −1.0000E+01 | −7.6787E−02 | −2.2557E−01 | 2.1795E−01 | −4.2101E−01 | 1.2541E+00 |
| R8 | 9.3006E−01 | −5.2265E−02 | −2.2630E−01 | 5.1495E−01 | −1.5572E+00 | 3.4604E+00 |
| R9 | −6.0470E+00 | −2.9794E−01 | −7.7693E−02 | −3.1516E−01 | −2.8644E−01 | 1.4613E+00 |
| R10 | −1.3135E+00 | −1.9874E−01 | 7.7362E−02 | −9.1215E−02 | 1.0241E−01 | 8.0485E−02 |
| R11 | −4.4143E+00 | −1.4755E−01 | 2.9974E−01 | −5.9327E−01 | 8.5653E−01 | −7.9668E−01 |
| R12 | 8.3525E+00 | −1.5640E−01 | −8.8320E−01 | 1.4126E+00 | −3.9805E−01 | −1.3005E+00 |
| R13 | 1.8899E+00 | 3.5307E−01 | −1.0378E+00 | 1.6062E+00 | −1.5206E+00 | 7.6668E−01 |
| R14 | −6.8961E−01 | 8.8212E−01 | −9.1704E−01 | 1.2047E+00 | −1.4594E+00 | 1.1516E+00 |

| | Conic coefficient | Aspherical coefficient | | | | |
|---|---|---|---|---|---|---|
| | k | A14 | A16 | A18 | A20 | / |
| R1 | −2.5000E+01 | −1.6682E−04 | 1.5749E−05 | −8.5993E−07 | 2.0669E−08 | / |
| R2 | −9.1444E+00 | −1.8892E−01 | 8.2584E−02 | −2.0603E−02 | 2.1894E−03 | / |
| R3 | −6.0227E−01 | −6.5064E+00 | 1.0032E+01 | −7.2237E+00 | 1.9792E+00 | / |
| R4 | 9.9906E+00 | 2.0425E+00 | −2.5545E+00 | 0.0000E+00 | 0.0000E+00 | / |
| R5 | −2.8588E−01 | −3.2524E−01 | 0.0000E+00 | 0.0000E+00 | 0.0000E+00 | / |
| R6 | −1.0000E+01 | −1.4685E+00 | 1.4465E+00 | 0.0000E+00 | 0.0000E+00 | / |
| R7 | −1.0000E+01 | −9.0710E−01 | 8.4848E−02 | 0.0000E+00 | 0.0000E+00 | / |
| R8 | 9.3006E−01 | −4.0398E+00 | 2.1694E+00 | −2.7604E−01 | 0.0000E+00 | / |
| R9 | −6.0470E+00 | −2.0786E+00 | 9.8100E−01 | 0.0000E+00 | 0.0000E+00 | / |
| R10 | −1.3135E+00 | −1.2627E−01 | 3.6725E−02 | 0.0000E+00 | 0.0000E+00 | / |
| R11 | −4.4143E+00 | 6.9633E−01 | −5.3497E−01 | 2.4165E−01 | −4.4109E−02 | / |
| R12 | 8.3525E+00 | 1.9551E+00 | −1.2874E+00 | 4.2756E−01 | −5.7761E−02 | / |
| R13 | 1.8899E+00 | −1.3067E−01 | −5.1382E−02 | 2.7170E−02 | −3.5256E−03 | / |
| R14 | −6.8961E−01 | −5.6054E−01 | 1.6365E−01 | −2.6266E−02 | 1.7813E−03 | / |

$$z = (cr^2)/\{1 + [1 - (k+1)(c^2r^2)]^{1/2}\} + A4r^4 + A6r^6 + A8r^8 + A10r^{10} + A12r^{12} + A14r^{14} + A16r^{16} + A18r^{18} + A20r^{20}, \quad (1)$$

where k represents a conic coefficient, A4, A6, A8, A10, A12, A14, A16, A18, and A20 represent aspherical coefficients, c represents the curvature at the center of the optical surface, r represents a vertical distance between a point on an aspherical curve and the optical axis, Z represents an aspherical depth (a vertical distance between a point on an aspherical surface, having a distance of r from the optic axis, and a surface tangent to a vertex of the aspherical surface on the optic axis).

For convenience, the aspherical surface of each lens adopts the aspherical surface shown in the above equation (1). However, the present disclosure is not limited to the aspherical surface defined by the polynomial form expressed by the equation (1).

Table 3 shows free-form surface data in the camera optical lens 10 according to the Embodiment 1 of the present disclosure.

TABLE 3

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R15 | −1.2917E+00 | −1.2645E−01 | −2.5261E−01 | −1.2760E−01 | −6.2044E−01 | −1.8645E+00 | −1.8617E+00 | −6.1863E−01 |
| R16 | −3.7641E+00 | −1.9148E−01 | −3.8219E−01 | −1.9294E−01 | 1.0472E−01 | 3.1362E−01 | 3.1362E−01 | 1.0694E−01 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R15 | 1.2137E+00 | 4.8587E+00 | 7.2898E+00 | 4.8544E+00 | 1.2132E+00 | −1.1097E+00 | −5.5494E+00 | −1.1100E+01 |
| R16 | −1.8738E−02 | −7.5054E−02 | −1.1122E−01 | −7.4967E−02 | −1.9844E−02 | −1.5590E−02 | −7.7850E−02 | −1.5538E−01 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^6Y^6$ |
|---|---|---|---|---|---|---|---|---|
| R15 | −1.1101E+01 | −5.5494E+00 | −1.1102E+00 | 5.8130E−01 | 3.4873E+00 | 8.7177E+00 | 1.1625E+01 | 8.7189E+00 |
| R16 | −1.5634E−01 | −7.8145E−02 | −1.5574E−02 | 1.2179E−02 | 7.3082E−02 | 1.8245E−01 | 2.4335E−01 | 1.8250E−01 |

| | $X^4Y^8$ | $X^2Y^{10}$ | $X^0Y^{12}$ | $X^{14}Y^0$ | $X^{12}Y^2$ | $X^{10}Y^4$ | $X^8Y^6$ | $X^6Y^8$ |
|---|---|---|---|---|---|---|---|---|
| R15 | 3.4890E+00 | 5.8124E−01 | −1.8071E−01 | −1.2652E+00 | −3.7953E+00 | −6.3256E+00 | −6.3250E+00 | −3.7956E+00 |
| R16 | 7.3209E−02 | 1.2282E−02 | −3.9264E−03 | −2.7496E−02 | −8.2491E−02 | −1.3745E−01 | −1.3736E−01 | −8.2341E−02 |

TABLE 3-continued

|     | $X^4Y^{10}$ | $X^2Y^{12}$ | $X^0Y^{12}$ | $X^{16}Y^0$ | $X^{14}Y^2$ | $X^{12}Y^4$ | $X^{10}Y^6$ | $X^8Y^8$ |
|---|---|---|---|---|---|---|---|---|
| R15 | −1.2649E+00 | −1.8039E−01 | 3.2338E−02 | 2.5887E−01 | 9.0625E−01 | 1.8120E+00 | 2.2653E+00 | 1.8120E+00 |
| R16 | −2.7450E−02 | −3.9226E−03 | 6.8211E−04 | 5.4583E−03 | 1.9106E−02 | 3.8233E−02 | 4.7740E−02 | 3.8230E−02 |
|     | $X^6Y^{10}$ | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ |
| R15 | 9.0587E−01 | 2.5843E−01 | 3.2340E−02 | −2.9863E−03 | −2.6862E−02 | −1.0741E−01 | −2.5051E−01 | −3.7583E−01 |
| R16 | 1.9084E−02 | 5.4408E−03 | 6.6986E−04 | −6.2634E−05 | −5.6364E−04 | −2.2522E−03 | −5.2510E−03 | −7.8910E−03 |
|     | $X^{10}Y^8$ | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ |
| R15 | −3.7581E−01 | −2.5092E−01 | −1.0736E−01 | −2.7143E−02 | −3.0706E−03 | 1.0470E−04 | 1.0352E−03 | 4.6028E−03 |
| R16 | −7.8922E−03 | −5.2547E−03 | −2.2758E−03 | −5.7182E−04 | −6.0808E−05 | 2.3950E−06 | 2.3933E−05 | 1.0736E−04 |
|     | $X^{16}Y^4$ | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ |
| R15 | 1.2348E−02 | 2.1466E−02 | 2.5826E−02 | 2.1665E−02 | 1.2462E−02 | 4.6203E−03 | 1.2040E−03 | 1.2221E−04 |
| R16 | 2.8501E−04 | 5.0026E−04 | 6.0427E−04 | 4.9889E−04 | 2.8755E−04 | 1.1239E−04 | 2.6720E−05 | 2.3405E−06 |

$$z = \frac{cr^2}{1 + \sqrt{1 - (1+k)c^2 r^2}} + \sum_{i=1}^{N} B_i E_i(x, y), \quad (2)$$

where k represents a conic coefficient, Bi represents a free-form surface coefficient, c represents the curvature at the center of the optical surface, r represents a vertical distance between the a point on the free-form surface and the optical axis, x represents the x-direction component of r, y represents the y-direction component of r, z represents aspherical depth (a vertical distance between a point on an aspherical surface, having a distance of r from the optic axis, and a surface tangent to a vertex of the aspherical surface on the optic axis)

For convenience, each free-form surface adopts the surface type defined by the extended polynomial shown in the above equation (1). However, the present disclosure is not limited to the free-form surface defined by the polynomial form expressed by the equation (1).

Figure 2:
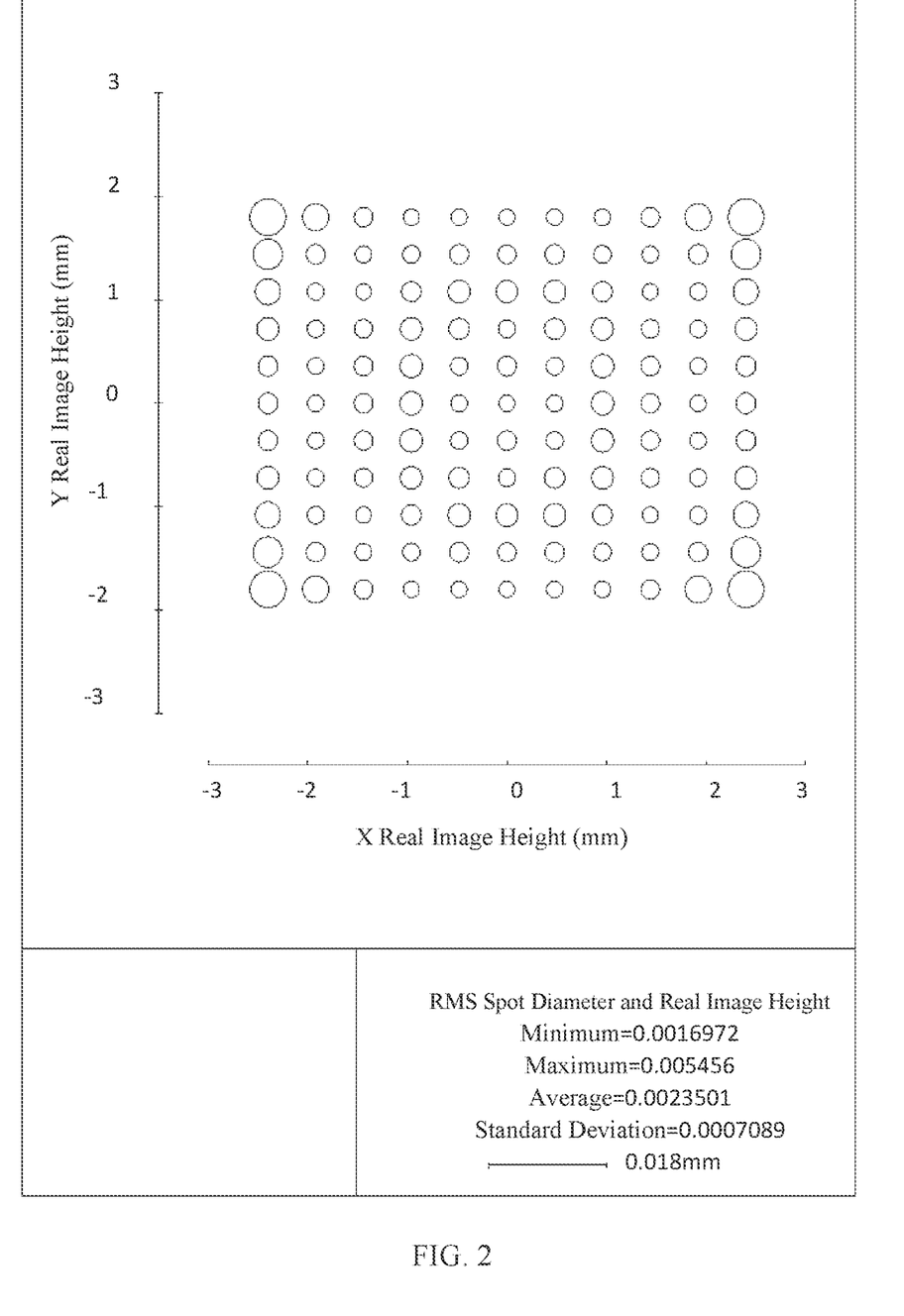
FIG. 2 illustrates a situation where RMS spot diameter of the camera optical lens shown in FIG. 1 is located in a first quadrant.

FIG. 2 shows a situation where the RMS spot diameter of the camera optical lens 10 according to the Embodiment 1 is located in a first quadrant. According to FIG. 2, it can be seen that the camera optical lens 10 according to the Embodiment 1 can achieve good imaging quality.

The following Table 10 shows values corresponding to various numerical values in each of Examples 1, 2, and 3 and the parameters already specified in the condition.

As shown in Table 10, the Embodiment 1 satisfies respective condition.

As an example, an entrance pupil diameter ENPD of the camera optical lens 10 is 1.000 mm, the full FOV image height IH (in a diagonal direction) is 6.000 mm, the image height in an x direction is 4.800 mm, the image height in a y direction is 3.600 mm, and the imaging effect is the best in this rectangular area; the FOV in a diagonal direction is 120.00°, the FOV in the x direction is 107.37°, and the FOV in the y direction is 90.94°. The camera optical lens 10 satisfies the design requirements of a wide angle, ultra-thinness, and a large aperture, and its on-axis and off-axis color aberrations is sufficiently corrected, and the camera optical lens 10 has excellent optical characteristics.

Embodiment 2

Figure 3:
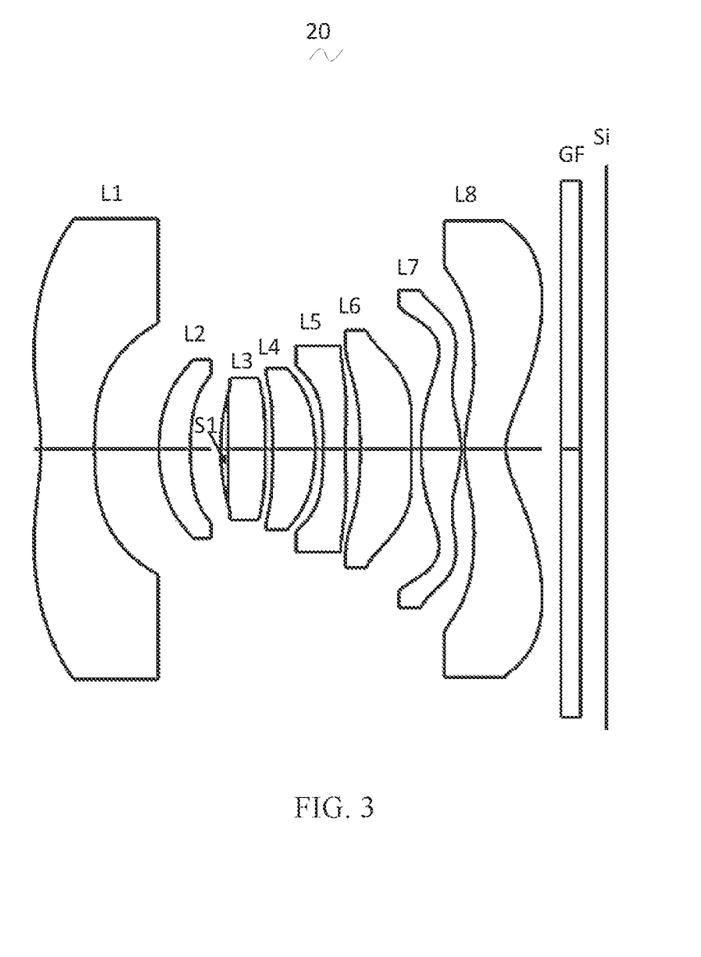
FIG. 3 is a schematic structural diagram of a camera optical lens according to Embodiment 2 of the present disclosure.

The Embodiment 2 is basically the same as the Embodiment 1, and the reference signs in the Embodiment 2 are the same as those in the Embodiment 1, and only a difference thereof will be described in the following.

FIG. 3 illustrates a camera optical lens 20 according to Embodiment 2 of the present disclosure. As an example, the object side surface of the fourth lens L4 is convex in a paraxial region.

Table 4, Table 5, and Table 6 show design data of the camera optical lens 20 according to the Embodiment 2 of the present disclosure. Herein, the object side surface and the image side surface of the first lens L1 are free-form surfaces.

TABLE 4

|     | R       | d         |        | nd     |     | vd    |
|-----|---------|-----------|--------|--------|-----|-------|
| S1  | ∞       | d0 =      | −2.036 |        |     |       |
| R1  | −2.534  | d1 =      | 0.585  | nd1    | v1  | 56.43 |
| R2  | 7.156   | d2 =      | 0.699  |        |     |       |
| R3  | 1.856   | d3 =      | 0.341  | nd2    | v2  | 20.53 |
| R4  | 2.852   | d4 =      | 0.332  |        |     |       |
| R5  | 2.741   | d5 =      | 0.485  | nd3    | v3  | 56.43 |
| R6  | −13.486 | d6 =      | 0.074  |        |     |       |
| R7  | 469.930 | d7 =      | 0.467  | nd4    | v4  | 56.43 |
| R8  | −2.097  | d8 =      | 0.087  |        |     |       |
| R9  | −7.325  | d9 =      | 0.240  | nd5    | v5  | 18.40 |
| R10 | 7.328   | d10 =     | 0.166  |        |     |       |
| R11 | −5.414  | d11 =     | 0.551  | nd6    | v6  | 56.43 |
| R12 | 8.796   | d12 =     | 0.110  |        |     |       |
| R13 | 3.553   | d13 =     | 0.432  | nd7    | v7  | 56.43 |
| R14 | −1.034  | d14 =     | 0.040  |        |     |       |
| R15 | 1.601   | d15 =     | 0.449  | nd8    | v8  | 28.29 |
| R16 | 0.675   | d16 =     | 0.600  |        |     |       |
| R17 | ∞       | d17 =     | 0.210  | ndg    | vg  | 64.17 |
| R18 | ∞       | d18 =     | 0.283  |        |     |       | nd1 1.5444
nd2 1.6610
nd3 1.5444
nd4 1.5444
nd5 1.6800
nd6 1.5444
nd7 1.5444
nd8 1.6032
ndg 1.5168

Table 5 shows aspherical data of each lens in the camera optical lens 20 according to the Embodiment 2 of the present disclosure.

TABLE 5

| | Conic coefficient | Aspherical coefficient | | | | |
|---|---|---|---|---|---|---|
| | k | A4 | A6 | A8 | A10 | A12 |
| R3 | −8.4639E−01 | 7.9902E−02 | 7.6132E−02 | −3.0516E−01 | 7.1081E−01 | 8.5920E−02 |
| R4 | 8.8252E+00 | 1.1805E−01 | −2.0114E−01 | 1.2779E+00 | −3.3283E+00 | 4.7535E+00 |
| R5 | −1.0370E+00 | 4.9414E−02 | 3.9619E−02 | −7.4779E−02 | 1.7602E−01 | −1.8546E−01 |
| R6 | −1.0000E+01 | −1.5176E−01 | −1.2523E−01 | 4.1813E−01 | −6.5941E−01 | 1.0676E+00 |
| R7 | −1.0000E+01 | −1.4095E−01 | −2.0156E−01 | 2.7863E−01 | −3.0324E−01 | 1.4372E+00 |
| R8 | 1.6323E+00 | −5.4607E−02 | −4.9926E−01 | 1.8066E+00 | −4.9448E+00 | 9.1507E+00 |
| R9 | −6.7691E+00 | −2.4130E−01 | −6.1172E−01 | 2.2136E+00 | −5.6503E+00 | 1.0070E+01 |
| R10 | 5.3671E+00 | −1.3598E−01 | −2.3766E−01 | 8.2709E−01 | −1.6011E+00 | 2.2737E+00 |
| R11 | 8.5805E+00 | −1.1572E−01 | 1.2450E−01 | −5.2484E−02 | −5.7360E−01 | 1.5884E+00 |
| R12 | 5.7331E+00 | −2.0521E−01 | −6.2628E−01 | 7.4980E−01 | 5.9374E−01 | −2.2884E+00 |
| R13 | 2.6321E+00 | 3.5302E−01 | −7.8180E−01 | 9.0930E−01 | −4.5231E−01 | −3.2862E−01 |
| R14 | −6.8345E−01 | 8.4987E−01 | −6.9421E−01 | 8.9527E−01 | −1.2806E+00 | 1.1212E+00 |
| R15 | −9.0298E−01 | −2.6012E−01 | −1.7603E−01 | 4.9824E−01 | −4.2819E−01 | 1.9668E−01 |
| R16 | −3.9349E+00 | −1.6064E−01 | 8.8155E−02 | −2.3090E−02 | −6.4730E−04 | 2.3163E−03 |

| | Conic coefficient | Aspherical coefficient | | | | |
|---|---|---|---|---|---|---|
| | k | A14 | A16 | A18 | A20 | / |
| R3 | −8.4639E−01 | −3.0219E+00 | 5.4904E+00 | −4.1906E+00 | 1.1724E+00 | / |
| R4 | 8.8252E+00 | −2.5760E+00 | −4.1313E−01 | 0.0000E+00 | 0.0000E+00 | / |
| R5 | −1.0370E+00 | 0.0000E+00 | 0.0000E+00 | 0.0000E+00 | 0.0000E+00 | / |
| R6 | −1.0000E+01 | −5.2971E−01 | −2.2791E−01 | 0.0000E+00 | 0.0000E+00 | / |
| R7 | −1.0000E+01 | −3.0026E+00 | 3.2270E+00 | −1.3886E+00 | 0.0000E+00 | / |
| R8 | 1.6323E+00 | −1.0116E+01 | 5.7364E+00 | −1.1050E+00 | 0.0000E+00 | / |
| R9 | −6.7691E+00 | −1.1151E+01 | 6.4707E+00 | −1.4169E+00 | 0.0000E+00 | / |
| R10 | 5.3671E+00 | −2.0829E+00 | 1.1506E+00 | −3.5217E−01 | 4.6102E−02 | / |
| R11 | 8.5805E+00 | −1.7373E+00 | 9.5540E−01 | −2.5959E−01 | 2.6740E−02 | / |
| R12 | 5.7331E+00 | 2.6139E+00 | −1.5614E+00 | 4.8978E−01 | −6.3442E−02 | / |
| R13 | 2.6321E+00 | 5.9154E−01 | −3.3780E−01 | 8.8760E−02 | −9.0187E−03 | / |
| R14 | −6.8345E−01 | −5.7465E−01 | 1.7161E−01 | −2.7762E−02 | 1.8867E−03 | / |
| R15 | −9.0298E−01 | −5.2858E−02 | 8.2421E−03 | −6.8086E−04 | 2.2519E−05 | / |
| R16 | −3.9349E+00 | −7.2536E−04 | 1.1226E−04 | −9.1085E−06 | 3.1084E−07 | / |

Table 6 shows the free-form surface data in the camera optical lens 20 according to the Embodiment 2 of the present disclosure.

TABLE 6

| | Free-form surface coefficient | | | | | | | |
|---|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R1 | −2.5000E+01 | 7.9055E−02 | 1.5833E−01 | 7.9158E−02 | −4.1266E−02 | −1.2412E−01 | −1.2398E−01 | −4.1420E−02 |
| R2 | −5.7138E+00 | 2.9250E−01 | 5.8695E−01 | 2.9275E−01 | −3.1533E−01 | −9.5176E−01 | −9.5121E−01 | −3.1559E−01 |
| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
| R1 | 1.7047E−02 | 6.8320E−02 | 1.0242E−01 | 6.8246E−02 | 1.7090E−02 | −5.1818E−03 | −2.5922E−02 | −5.1811E−02 |
| R2 | 4.6261E−01 | 1.8566E+00 | 2.7816E+00 | 1.8565E+00 | 4.6154E−01 | −5.7853E−01 | −2.8948E+00 | −5.7798E+00 |
| | $X^4Y^6$ | $X^2Y^8$ | $X^0Y^{10}$ | $X^{12}Y^0$ | $X^{10}Y^2$ | $X^8Y^4$ | $X^6Y^6$ | $X^6Y^6$ |
| R1 | −5.1830E−02 | −2.5892E−02 | −5.1748E−03 | 1.1241E−03 | 6.7420E−03 | 1.6844E−02 | 2.2475E−02 | 1.6852E−02 |
| R2 | −5.7876E+00 | −2.8951E+00 | −5.7759E−01 | 5.3161E−01 | 3.1898E+00 | 7.9578E+00 | 1.0634E+01 | 7.9699E+00 |
| | $X^4Y^8$ | $X^2Y^{10}$ | $X^0Y^{12}$ | $X^{14}Y^0$ | $X^{12}Y^2$ | $X^{10}Y^4$ | $X^8Y^6$ | $X^6Y^8$ |
| R1 | 6.7366E−03 | 1.1214E−03 | −1.6701E−04 | −1.1687E−03 | −3.5070E−03 | −5.8480E−03 | −5.8456E−03 | −3.5079E−03 |
| R2 | 3.1909E+00 | 5.3183E−01 | −3.3001E−01 | −2.3102E+00 | −6.9231E+00 | −1.1544E+01 | −1.1565E+01 | −6.9221E+00 |
| | $X^4Y^{10}$ | $X^2Y^{12}$ | $X^0Y^{14}$ | $X^{16}Y^0$ | $X^{14}Y^2$ | $X^{12}Y^4$ | $X^{10}Y^6$ | $X^8Y^8$ |
| R1 | −1.1718E−03 | −1.6737E−04 | 1.6072E−05 | 1.2844E−04 | 4.5125E−04 | 8.9916E−04 | 1.1266E−03 | 9.0165E−04 |
| R2 | −2.3111E+00 | −3.2998E−01 | 1.3015E−01 | 1.0405E+00 | 3.6438E+00 | 7.2854E+00 | 9.1164E+00 | 7.2842E+00 |
| | $X^6Y^{10}$ | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ |
| R1 | 4.4933E−04 | 1.2917E−04 | 1.6148E−05 | −9.0478E−07 | −8.1033E−06 | −3.2440E−05 | −7.5897E−05 | −1.1298E−04 |
| R2 | 3.6424E+00 | 1.0400E+00 | 1.3000E−01 | −2.9087E−02 | −2.6152E−01 | −1.0380E+00 | −2.4586E+00 | −3.6567E+00 |

TABLE 6-continued

| | $X^{10}Y^8$ | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ |
|---|---|---|---|---|---|---|---|---|
| R1 | −1.1353E−04 | −7.6328E−05 | −3.1815E−05 | −7.8638E−06 | −9.0016E−07 | 2.2886E−08 | 2.2750E−07 | 9.6673E−07 |
| R2 | −3.6396E+00 | −2.4451E+00 | −1.0501E+00 | −2.6055E−01 | −2.9234E−02 | 2.7652E−03 | 2.7771E−02 | 1.1895E−01 |

| | $X^{16}Y^4$ | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ |
|---|---|---|---|---|---|---|---|---|
| R1 | 2.7824E−06 | 4.5967E−06 | 5.4493E−06 | 4.9898E−06 | 2.4797E−06 | 1.0078E−06 | 1.6508E−07 | 2.3017E−08 |
| R2 | 3.3903E−01 | 5.7717E−01 | 6.8803E−01 | 5.6747E−01 | 3.3625E−01 | 1.2641E−01 | 2.7377E−02 | 2.8456E−03 |

Figure 4:
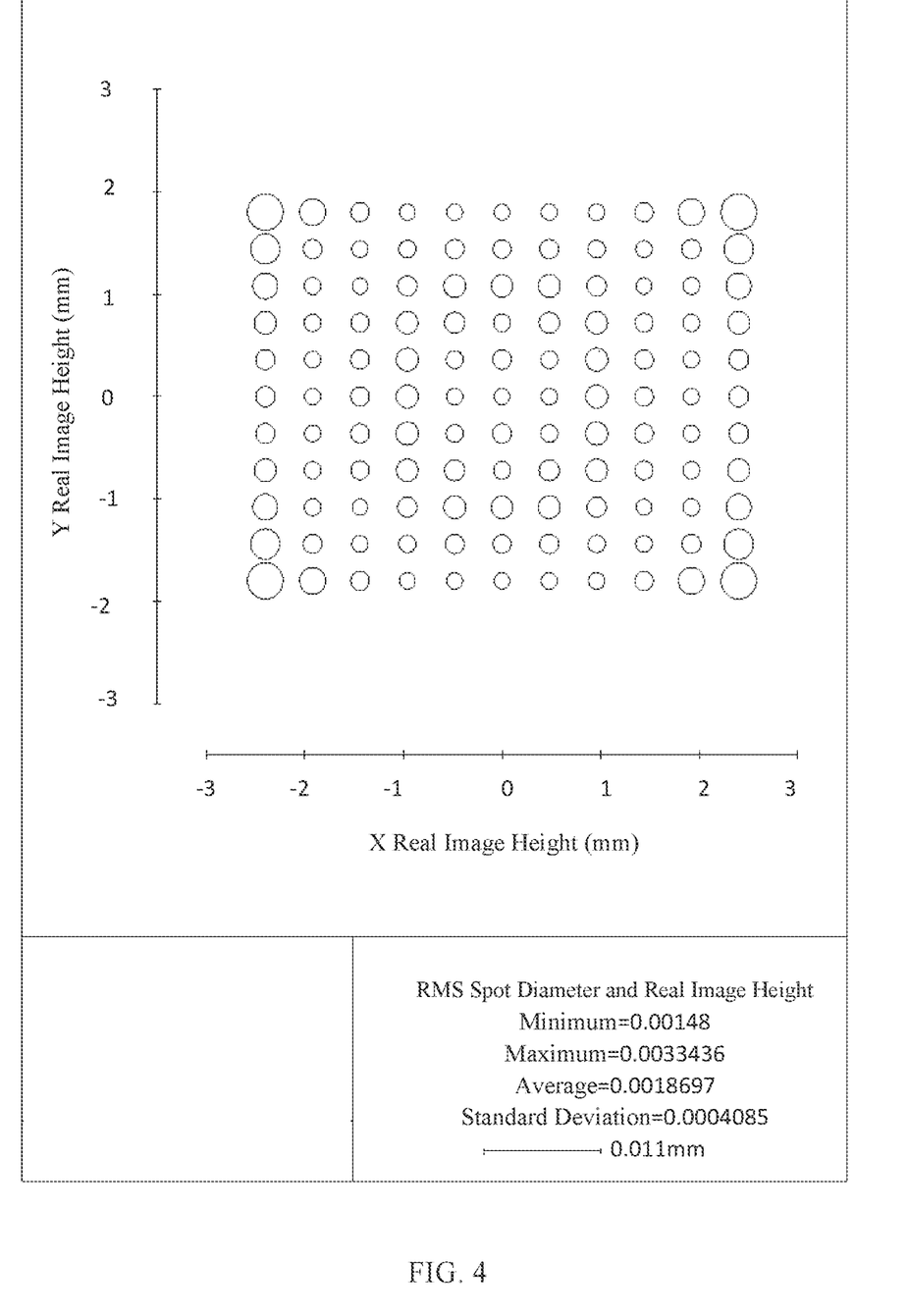
FIG. 4 illustrates a situation where RMS spot diameter of the camera optical lens shown in FIG. 3 is located in a first quadrant.

FIG. 4 shows a situation where the RMS spot diameter of the camera optical lens 20 according to the Embodiment 2 is located in a first quadrant. According to FIG. 4, it can be seen that the camera optical lens 20 according to the Embodiment 2 can achieve good imaging quality.

As shown in Table 10, the Embodiment 2 satisfies respective condition.

As an example, the entrance pupil diameter ENPD of the camera optical lens 20 is 1.000 mm, the full FOV image height IH (in a diagonal direction) is 6.000 mm, the image height in an x direction is 4.800 mm, the image height in a y direction is 3.600 mm, and the imaging effect is the best in this rectangular area; the FOV in a diagonal direction is 120.00°, the FOV in the x direction is 107.34°, and the FOV in the y direction is 90.86°. The camera optical lens 20 satisfies the design requirements of a wide angle, ultra-thinness, and a large aperture, and its on-axis and off-axis color aberration is sufficiently corrected, and the camera optical lens 20 has excellent optical characteristics.

Embodiment 3

Figure 5:
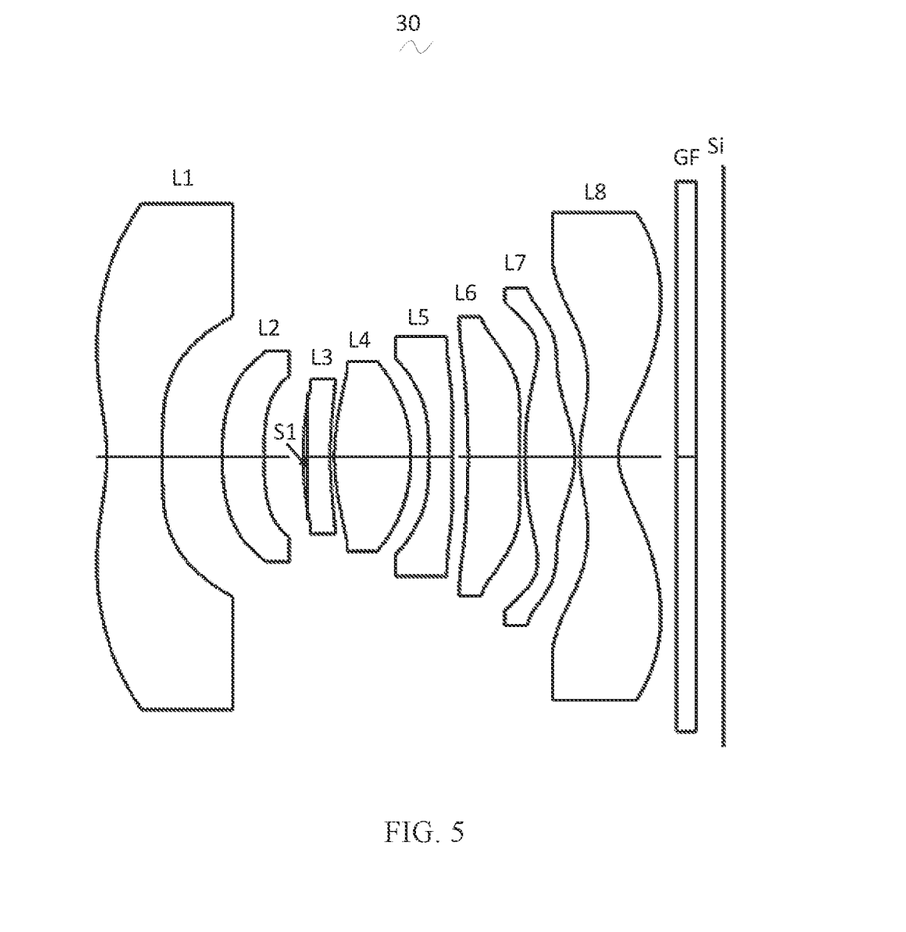
FIG. 5 is a schematic structural diagram of a camera optical lens according to Embodiment 3 of the present disclosure.

The Embodiment 3 is basically the same as the Embodiment 1, and the reference signs in the Embodiment 2 are the same as those in the Embodiment 1, and only a difference thereof will be described in the following.

FIG. 5 illustrates a camera optical lens 30 according to Embodiment 3 of the present disclosure. As an example, the image side surface of the first lens L1 is convex in a paraxial region; the third lens L3 has a negative refractive power; the image side surface of the third lens L3 is concave in a paraxial region; and the object side surface of the fourth lens L4 is convex in a paraxial region.

Table 7, Table 8, and Table 9 show design data of the camera optical lens 30 according to the Embodiment 3 of the present disclosure. Herein, the object side surface and the image side surface of the first lens L1 are free-form surfaces.

TABLE 7

| | R | d | | nd | | vd |
|---|---|---|---|---|---|---|
| S1 | ∞ | d0 = | −2.082 | | | |
| R1 | −2.040 | d1 = | 0.580 | nd1 | 1.5444 | v1 | 56.43 |
| R2 | −35.714 | d2 = | 0.619 | | | |
| R3 | 2.834 | d3 = | 0.434 | nd2 | 1.6501 | v2 | 21.44 |
| R4 | 4.018 | d4 = | 0.405 | | | |
| R5 | 4.394 | d5 = | 0.283 | nd3 | 1.5444 | v3 | 56.43 |
| R6 | 3.624 | d6 = | 0.040 | | | |
| R7 | 2.088 | d7 = | 0.792 | nd4 | 1.5444 | v4 | 56.43 |
| R8 | −2.003 | d8 = | 0.189 | | | |
| R9 | −7.232 | d9 = | 0.240 | nd5 | 1.6800 | v5 | 18.40 |
| R10 | 7.687 | d10 = | 0.167 | | | |
| R11 | −9.043 | d11 = | 0.536 | nd6 | 1.5444 | v6 | 56.43 |
| R12 | 16.906 | d12 = | 0.058 | | | |
| R13 | 5.915 | d13 = | 0.515 | nd7 | 1.5444 | v7 | 56.43 |
| R14 | −1.032 | d14 = | 0.049 | | | |
| R15 | 1.422 | d15 = | 0.403 | nd8 | 1.5661 | v8 | 37.70 |
| R16 | 0.621 | d16 = | 0.600 | | | |
| R17 | ∞ | d17 = | 0.210 | ndg | 1.5168 | vg | 64.17 |
| R18 | ∞ | d18 = | 0.278 | | | |

Table 8 shows aspherical data of each lens in the camera optical lens 30 according to the Embodiment 3 of the present disclosure.

TABLE 8

| | Conic coefficient | Aspherical coefficient | | | | |
|---|---|---|---|---|---|---|
| | k | A4 | A6 | A8 | A10 | A12 |
| R3 | 4.0170E+00 | 1.1221E−01 | −1.7243E−01 | 9.9811E−01 | −3.1960E+00 | 6.7537E+00 |
| R4 | 1.2630E+01 | 1.7437E−01 | 1.0202E−01 | −1.7314E−01 | 1.8705E+00 | −5.1589E+00 |
| R5 | 5.5673E−01 | 8.5658E−02 | 1.6389E−02 | 2.7386E−02 | −8.0102E−02 | 0.0000E+00 |
| R6 | 4.9054E+00 | −2.0188E−01 | 5.1102E−01 | −1.5968E+00 | 3.5897E+00 | −5.0223E+00 |
| R7 | 8.5735E−01 | −2.0494E−01 | 3.7812E−01 | −9.3193E−01 | 1.4933E+00 | −1.4602E+00 |
| R8 | 6.6656E−01 | −1.5900E−01 | 8.9520E−02 | 1.6799E−01 | −6.6741E−01 | 9.8259E−01 |
| R9 | 4.2072E+01 | −4.8327E−01 | 3.8187E−01 | −4.9147E−01 | 1.4986E+00 | −2.9556E+00 |
| R10 | 7.2285E+00 | −2.6643E−01 | 2.0272E−01 | 3.2190E−01 | −2.5410E−01 | 3.2213E−01 |
| R11 | 3.9379E+01 | 4.7340E−02 | −1.1286E−01 | 2.2824E−01 | −3.0850E−01 | 2.2595E−01 |
| R12 | −2.5091E+00 | 1.9769E−02 | −4.1645E−01 | 1.2463E−01 | 4.6890E−01 | −6.0426E−01 |
| R13 | 7.4151E+00 | 2.6331E−01 | −5.5503E−01 | 5.9331E−01 | −2.9836E−01 | −7.2050E−02 |
| R14 | −6.9496E−01 | 5.3805E−01 | −7.2255E−01 | 1.5851E+00 | −2.0944E+00 | 1.5797E+00 |
| R15 | −1.0256E+00 | −4.4571E−01 | 1.2135E−01 | 1.7726E−01 | −2.3107E−01 | 1.2840E−01 |
| R16 | −3.0216E+00 | −2.4217E−01 | 2.0139E−01 | −1.1423E−01 | 4.3717E−02 | −1.1258E−02 |

TABLE 8-continued

|  | Conic coefficient | Aspherical coefficient | | | | |
|---|---|---|---|---|---|---|
|  | k | A14 | A16 | A18 | A20 | / |
| R3 | 4.0170E+00 | −9.0422E+00 | 7.3506E+00 | −3.2918E+00 | 6.1453E−01 | / |
| R4 | 1.2630E+01 | 7.1238E+00 | −3.7840E+00 | 0.0000E+00 | 0.0000E+00 | / |
| R5 | 5.5673E−01 | 0.0000E+00 | 0.0000E+00 | 0.0000E+00 | 0.0000E+00 | / |
| R6 | 4.9054E+00 | 3.9416E+00 | −1.4186E+00 | 0.0000E+00 | 0.0000E+00 | / |
| R7 | 8.5735E−01 | 6.5417E−01 | 1.3833E−01 | −1.8948E−01 | 0.0000E+00 | / |
| R8 | 6.6656E−01 | −7.2930E−01 | 2.5177E−01 | 0.0000E+00 | 0.0000E+00 | / |
| R9 | 4.2072E+01 | 3.2810E+00 | −1.9134E+00 | 4.5524E−01 | 0.0000E+00 | / |
| R10 | 7.2285E+00 | −1.9789E−01 | 5.7420E−02 | −6.2125E−03 | 0.0000E+00 | / |
| R11 | 3.9379E+01 | −7.9901E−02 | 1.1570E−02 | −3.4844E−04 | 0.0000E+00 | / |
| R12 | −2.5091E+00 | 3.2556E−01 | −8.4338E−02 | 8.5918E−03 | 0.0000E+00 | / |
| R13 | 7.4151E+00 | 1.6843E−01 | −8.6674E−02 | 2.0223E−02 | −1.8422E−03 | / |
| R14 | −6.9496E−01 | −7.1903E−01 | 1.9708E−01 | −2.9981E−02 | 1.9445E−03 | / |
| R15 | −1.0256E+00 | −4.0245E−02 | 7.3824E−03 | −7.4308E−04 | 3.1825E−05 | / |
| R16 | −3.0216E+00 | 1.9164E−03 | −2.0663E−04 | 1.2789E−05 | −3.4634E−07 | / |

Table 9 shows free-form surface data in the camera optical lens 30 according to the Embodiment 3 of the present disclosure.

TABLE 9

| | Free-form surface coefficient | | | | | | |
|---|---|---|---|---|---|---|---|
| | k | $X^4Y^0$ | $X^2Y^2$ | $X^0Y^4$ | $X^6Y^0$ | $X^4Y^2$ | $X^2Y^4$ | $X^0Y^6$ |
| R1 | −1.6083E+01 | 8.6539E−02 | 1.7316E−01 | 8.6607E−02 | −4.2581E−02 | −1.2776E−01 | −1.2780E−01 | −4.2622E−02 |
| R2 | 5.0000E+01 | 3.3222E−01 | 6.6550E−01 | 3.3252E−01 | −3.4750E−01 | −1.0441E+00 | −1.0456E+00 | −3.4758E−01 |

| | $X^8Y^0$ | $X^6Y^2$ | $X^4Y^4$ | $X^2Y^6$ | $X^0Y^8$ | $X^{10}Y^0$ | $X^8Y^2$ | $X^6Y^4$ |
|---|---|---|---|---|---|---|---|---|
| R1 | 1.6912E−02 | 6.7641E−02 | 1.0149E−01 | 6.7652E−02 | 1.6920E−02 | −4.9789E−03 | −2.4894E−02 | −4.9791E−02 |
| R2 | 5.2214E−01 | 2.0900E+00 | 3.1348E+00 | 2.0928E+00 | 5.2174E−01 | −6.3161E−01 | −3.1589E+00 | −6.3154E+00 |

| | $X^4Y^6$ | $X^2Y^8$ | $X^0Y^{10}$ | $X^{12}Y^0$ | $X^{10}Y^2$ | $X^8Y^4$ | $X^6Y^6$ | $X^6Y^6$ |
|---|---|---|---|---|---|---|---|---|
| R1 | −4.9784E−02 | −2.4892E−02 | −4.9782E−03 | 1.0350E−03 | 6.2105E−03 | 1.5526E−02 | 2.0698E−02 | 1.5527E−02 |
| R2 | −6.3160E+00 | −3.1608E+00 | −6.3141E−01 | 5.4529E−01 | 3.2722E+00 | 8.1781E+00 | 1.0908E+01 | 8.1755E+00 |

| | $X^4Y^8$ | $X^2Y^{10}$ | $X^0Y^{12}$ | $X^{14}Y^0$ | $X^{12}Y^2$ | $X^{10}Y^4$ | $X^8Y^6$ | $X^6Y^8$ |
|---|---|---|---|---|---|---|---|---|
| R1 | 6.2089E−03 | 1.0349E−03 | −1.4590E−04 | −1.0213E−03 | −3.0638E−03 | −5.1067E−03 | −5.1067E−03 | −3.0640E−03 |
| R2 | 3.2727E+00 | 5.4547E−01 | −3.0691E−01 | −2.1483E+00 | −6.4451E+00 | −1.0742E+01 | −1.0744E+01 | −6.4430E+00 |

| | $X^4Y^{10}$ | $X^2Y^{12}$ | $X^0Y^{14}$ | $X^{16}Y^0$ | $X^{14}Y^2$ | $X^{12}Y^4$ | $X^{10}Y^6$ | $X^8Y^8$ |
|---|---|---|---|---|---|---|---|---|
| R1 | −1.0217E−03 | −1.4600E−04 | 1.3252E−05 | 1.0600E−04 | 3.7103E−04 | 7.4212E−04 | 9.2754E−04 | 7.4216E−04 |
| R2 | −2.1480E+00 | −3.0693E−01 | 1.0396E−01 | 8.3148E−01 | 2.9114E+00 | 5.8198E+00 | 7.2780E+00 | 5.8226E+00 |

| | $X^6Y^{10}$ | $X^4Y^{12}$ | $X^2Y^{14}$ | $X^0Y^{16}$ | $X^{18}Y^0$ | $X^{16}Y^2$ | $X^{14}Y^4$ | $X^{12}Y^6$ |
|---|---|---|---|---|---|---|---|---|
| R1 | 3.7095E−04 | 1.0611E−04 | 1.3254E−05 | −6.9943E−07 | −6.2984E−06 | −2.5198E−05 | −5.8760E−05 | −8.8151E−05 |
| R2 | 2.9121E+00 | 8.3098E−01 | 1.0391E−01 | −1.8719E−02 | −1.6853E−01 | −6.7362E−01 | −1.5740E+00 | −2.3583E+00 |

| | $X^{10}Y^8$ | $X^8Y^{10}$ | $X^6Y^{12}$ | $X^4Y^{14}$ | $X^2Y^{16}$ | $X^0Y^{18}$ | $X^{20}Y^0$ | $X^{18}Y^2$ |
|---|---|---|---|---|---|---|---|---|
| R1 | −8.8141E−05 | −5.8753E−05 | −2.5191E−05 | −6.2684E−06 | −6.9546E−07 | 1.6266E−08 | 1.6350E−07 | 7.3446E−07 |
| R2 | −2.3582E+00 | −1.5731E+00 | −6.7397E−01 | −1.6869E−01 | −1.8733E−02 | 1.3166E−03 | 1.3228E−02 | 5.9098E−02 |

| | $X^{16}Y^4$ | $X^{14}Y^6$ | $X^{12}Y^8$ | $X^{10}Y^{10}$ | $X^8Y^{12}$ | $X^6Y^{14}$ | $X^4Y^{16}$ | $X^2Y^{18}$ |
|---|---|---|---|---|---|---|---|---|
| R1 | 1.9581E−06 | 3.4229E−06 | 4.1109E−06 | 3.4218E−06 | 1.9529E−06 | 7.3358E−07 | 1.5860E−07 | 1.5820E−08 |
| R2 | 1.5876E−01 | 2.7843E−01 | 3.3157E−01 | 2.7640E−01 | 1.5804E−01 | 5.9097E−02 | 1.3438E−02 | 1.3275E−03 |

Figure 6:
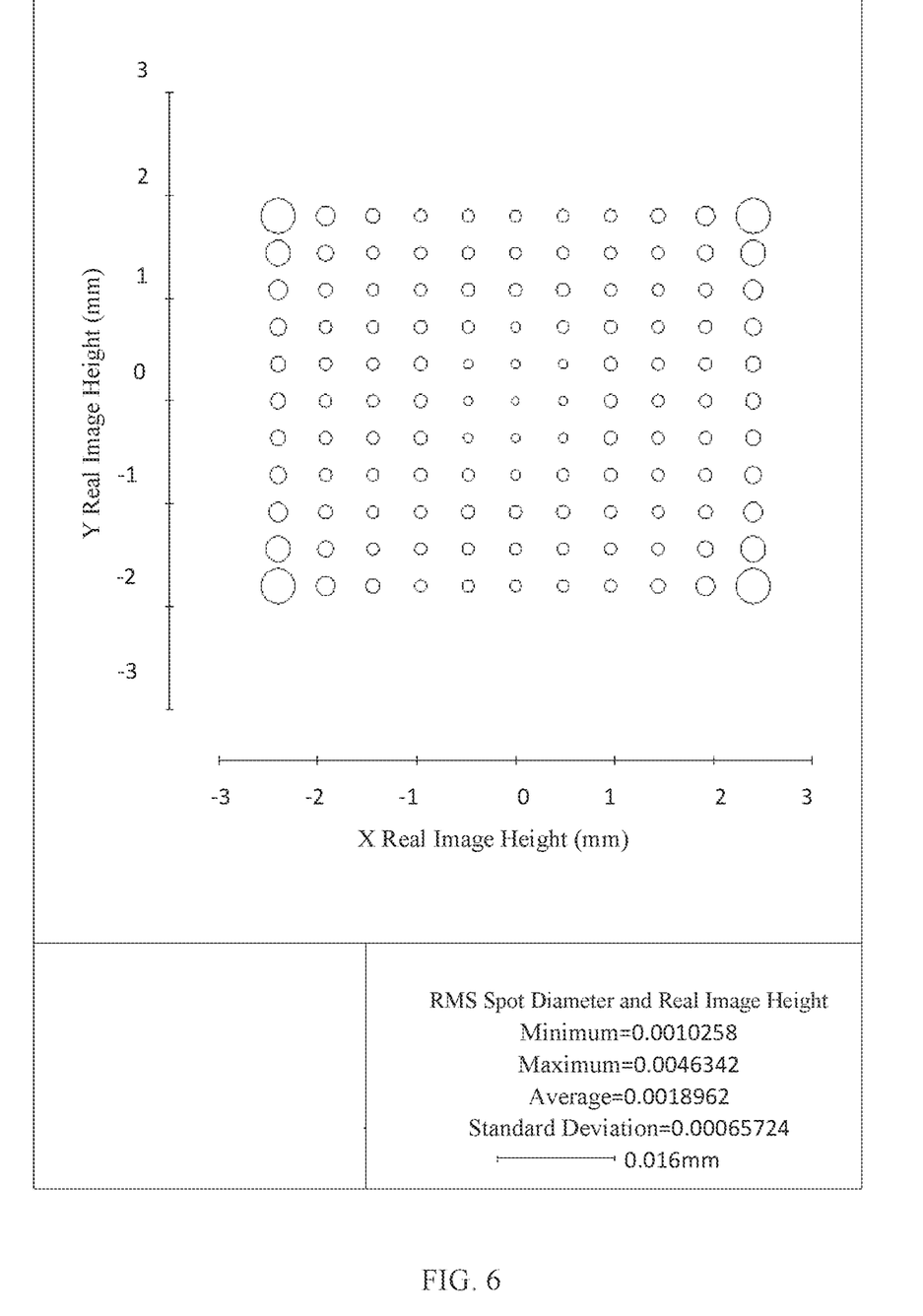
FIG. 6 illustrates a situation where RMS spot diameter of the camera optical lens shown in FIG. 5 is within a first quadrant.

FIG. 6 shows a situation where the RMS spot diameter of the camera optical lens 30 according to the Embodiment 3 is located in a first quadrant. According to FIG. 4, it can be seen that the camera optical lens 30 according to the Embodiment 3 can achieve good imaging quality.

The following Table 10 lists the respective numerical value corresponding to each condition in this embodiment according to the above-mentioned condition. Obviously, the imaging optical system according to this embodiment satisfies the above-mentioned condition.

As an example, the entrance pupil diameter ENPD of the camera optical lens 30 is 1.000 mm, the full FOV image height IH (in a diagonal direction) is 6.000 mm, the image height in an x direction is 4.800 mm, the image height in a y direction is 3.600 mm, and the imaging effect is the best in this rectangular area; the FOV in a diagonal direction is 119.99°, the FOV in the x direction is 107.17°, and the FOV in the y direction is 89.67°. The camera optical lens 30 satisfies the design requirements of a wide angle, ultra-thinness, and a large aperture, and its on-axis and off-axis color aberration is sufficiently corrected, and the camera optical lens 20 has excellent optical characteristics.

TABLE 10

| Parameters and condition expression | Embodiment 1 | Embodiment 2 | Embodiment 3 |
|---|---|---|---|
| f2/f1 | −1.912 | −2.089 | −3.215 |
| R9/R10 | −1.919 | −1.000 | −0.941 |
| d10/d12 | 2.435 | 1.509 | 2.879 |
| f | 1.800 | 1.800 | 1.800 |
| f1 | −3.399 | −3.355 | −3.986 |
| f2 | 6.498 | 7.008 | 12.813 |
| f3 | 4.457 | 4.216 | −43.478 |
| f4 | 3.440 | 3.825 | 2.009 |
| f5 | −5.703 | −5.300 | −5.391 |
| f6 | −4.651 | −6.053 | −10.709 |
| f7 | 1.508 | 1.517 | 1.653 |
| f8 | −2.287 | −2.353 | −2.371 |
| FNO | 1.800 | 1.800 | 1.800 |
| TTL | 6.151 | 6.151 | 6.398 |
| FOV | 120.00° | 120.00° | 119.99° |
| IH | 6.000 | 6.000 | 6.000 |

The above description merely illustrates some embodiments of the present disclosure. It should be noted that those skilled in the art may make improvements without departing from a creative concept of the present disclosure, and all these improvements shall fall into a protection scope of the present disclosure.

What is claimed is:

1. A camera optical lens, comprising, from an object side to an image side, a first lens, a second lens, a third lens, a fourth lens, a fifth lens, a sixth lens, a seventh lens, and an eighth lens;

wherein the first lens has a negative refractive power, the second lens has a positive refractive power, the fourth lens has a positive refractive power, the fifth lens has a negative refractive power, the sixth lens has a negative refractive power, the seventh lens has a positive refractive power, and the eighth lens has a negative refractive power, wherein at least one of the first lens, the second lens, the third lens, the fourth lens, the fifth lens, the sixth lens, the seventh lens, or the eighth lens has a free-form surface, and the camera optical lens satisfies:

$-3.50 \leq f2/f1 \leq -1.50;$ $-2.00 \leq R9/R10 \leq -0.80;$ and $2.435 \leq d10/d12 \leq 3.00,$ where f1 denotes a focal length of the first lens, f2 denotes a focal length of the second lens, R9 denotes a central curvature radius of an object side surface of the fifth lens, R10 denotes a central curvature radius of an image side surface of the fifth lens, d10 denotes an on-axis distance from the image side surface of the fifth lens to an object side surface of the sixth lens, and d12 denotes an on-axis distance from an image side surface of the sixth lens to an object side surface of the seventh lens.

2. The camera optical lens as described in claim 1, wherein the camera optical lens satisfies:

$-4.43 \leq f1/f \leq -1.24;$ $-2.24 \leq (R1+R2)/(R1-R2) \leq -0.28;$ and $0.05 \leq d1/TTL \leq 0.14,$ where f denotes a focal length of the camera optical lens, R1 denotes a central curvature radius of an object side surface of the first lens, R2 denotes a central curvature radius of an image side surface of the first lens, d1 denotes an on-axis thickness of the first lens, and TTL denotes a total optical length from an object-side surface of the first lens to an image plane of the camera optical lens along an optic axis.

3. The camera optical lens as described in claim 1, wherein the camera optical lens satisfies:

$1.81 \leq f2/f \leq 10.68;$ $-11.57 \leq (R3+R4)/(R3-R4) \leq -2.79;$ and $0.03 \leq d3/TTL \leq 0.10,$ where f denotes a focal length of the camera optical lens, R3 denotes a central curvature radius of an object side surface of the second lens, R4 denotes a central curvature radius of an image side surface of the second lens, d3 denotes an on-axis thickness of the second lens, and TTL denotes a total optical length from an object-side surface of the first lens to an image plane of the camera optical lens along an optic axis.

4. The camera optical lens as described in claim 1, wherein the camera optical lens satisfies:

$-48.31 \leq f3/f \leq 3.71;$ $-1.57 \leq (R5+R6)/(R5-R6) \leq 15.62;$ and $0.02 \leq d5/TTL \leq 0.12,$ where f denotes a focal length of the camera optical lens, f3 denotes a focal length of the third lens, R5 denotes a central curvature radius of an object side surface of the third lens, R6 denotes a central curvature radius of an image side surface of the third lens, d5 denotes an on-axis thickness of the third lens, and TTL denotes a total optical length from an object-side surface of the first lens to an image plane of the camera optical lens along an optic axis.

5. The camera optical lens as described in claim 1, wherein the camera optical lens satisfies:

$0.56 \leq f4/f \leq 3.19;$ $0.01 \leq (R7+R8)/(R7-R8) \leq 1.51;$ and $0.04 \leq d7/TTL \leq 0.19,$ where f denotes a focal length of the camera optical lens, f4 denotes a focal length of the fourth lens, R7 denotes a central curvature radius of an object side surface of the fourth lens, R8 denotes a central curvature radius of an image side surface of the fourth lens, d7 denotes an on-axis thickness of the fourth lens, and TTL denotes a total optical length from an object-side surface of the first lens to an image plane of the camera optical lens along an optic axis.

6. The camera optical lens as described in claim 1, wherein the camera optical lens satisfies:

$-6.34 \leq f5/f \leq -1.96$;

$-0.06 \leq (R9+R10)/(R9-R10) \leq 0.47$; and $0.02 \leq d9/TTL \leq 0.07$, where f denotes a focal length of the camera optical lens, f5 denotes a focal length of the fifth lens, R9 denotes a central curvature radius of the object side surface of the fifth lens, R10 denotes a central curvature radius of the image side surface of the fifth lens, d9 denotes an on-axis thickness of the fifth lens, and TTL denotes a total optical length from an object-side surface of the first lens to an image plane of the camera optical lens along an optic axis.

7. The camera optical lens as described in claim 1, wherein the camera optical lens satisfies:

$-11.90 \leq f6/f \leq -1.72$;

$-0.71 \leq (R11+R12)/(R11-R12) \leq -0.16$; and $0.04 \leq d11/TTL \leq 0.13$, where f denotes a focal length of the camera optical lens, f6 denotes a focal length of the sixth lens, R11 denotes a central curvature radius of an object side surface of the sixth lens, R12 denotes a central curvature radius of an image side surface of the sixth lens, d11 denotes an on-axis thickness of the sixth lens, and TTL denotes a total optical length from an object-side surface of the first lens to an image plane of the camera optical lens along an optic axis.

8. The camera optical lens as described in claim 1, wherein the camera optical lens satisfies:

$0.42 \leq f7/f \leq 1.38$;

$0.25 \leq (R13+R14)/(R13-R14) \leq 1.05$; and $0.04 \leq d13/TTL \leq 0.12$, where f denotes a focal length of the camera optical lens, f7 denotes a focal length of the seventh lens, R13 denotes a central curvature radius of an object side surface of the seventh lens, R14 denotes a central curvature radius of an image side surface of the seventh lens, d13 denotes an on-axis thickness of the seventh lens, and TTL denotes a total optical length from an object-side surface of the first lens to an image plane of the camera optical lens along an optic axis.

9. The camera optical lens as described in claim 1, wherein the camera optical lens satisfies:

$-2.63 \leq f8/f \leq -0.85$;

$1.14 \leq (R15+R16)/(R15-R16) \leq 3.83$; and $0.03 \leq d15/TTL \leq 0.11$, where f denotes a focal length of the camera optical lens, f8 denotes a focal length of the eighth lens, R15 denotes a central curvature radius of an object side surface of the eighth lens, R16 denotes a central curvature radius of an image side surface of the eighth lens, d15 denotes an on-axis thickness of the eighth lens, and TTL denotes a total optical length from an object-side surface of the first lens to an image plane of the camera optical lens along an optic axis.

\* \* \* \* \*